United States Patent
Wagschal

(10) Patent No.: US 10,918,959 B2
(45) Date of Patent: Feb. 16, 2021

(54) INSTANT AND HISTORICAL FANTASY SPORTS

(71) Applicant: Michael Wagschal, Corona Del Mar, CA (US)

(72) Inventor: Michael Wagschal, Corona Del Mar, CA (US)

(*) Notice: Subject to any disclaimer, the term of this patent is extended or adjusted under 35 U.S.C. 154(b) by 159 days.

(21) Appl. No.: 15/706,176

(22) Filed: Sep. 15, 2017

(65) Prior Publication Data

US 2018/0071638 A1    Mar. 15, 2018

Related U.S. Application Data

(60) Provisional application No. 62/394,997, filed on Sep. 15, 2016.

(51) Int. Cl.
| | | |
|---|---|---|
| *A63F 13/828* | (2014.01) | |
| *A63F 13/65* | (2014.01) | |
| *A63F 13/46* | (2014.01) | |
| *A63F 13/795* | (2014.01) | |

(52) U.S. Cl.
CPC ............ *A63F 13/828* (2014.09); *A63F 13/65* (2014.09); *A63F 13/46* (2014.09); *A63F 13/795* (2014.09); *A63F 2300/8005* (2013.01)

(58) Field of Classification Search
CPC ........ A63F 13/828; A63F 13/65; A63F 13/46; A63F 13/795
See application file for complete search history.

(56) References Cited

U.S. PATENT DOCUMENTS

| | | | |
|---|---|---|---|
| 2006/0217198 A1* | 9/2006 | Johnson | A63F 13/12 463/40 |
| 2011/0028195 A1* | 2/2011 | Pennington | A63F 13/65 463/2 |
| 2014/0121013 A1 | 5/2014 | Carson et al. | |
| 2014/0179442 A1* | 6/2014 | Quinlivan | A63F 13/65 463/43 |
| 2014/0274411 A1* | 9/2014 | Moffett | A63F 13/30 463/42 |
| 2015/0209679 A1 | 7/2015 | Givant | |
| 2015/0273346 A1* | 10/2015 | Ford | A63F 13/828 463/31 |
| 2016/0203670 A1 | 7/2016 | Ford | |
| 2016/0260285 A1 | 9/2016 | George | |

* cited by examiner

*Primary Examiner* — Tramar Y Harper
*Assistant Examiner* — Jeffrey K Wong
(74) *Attorney, Agent, or Firm* — Mintz, Levin, Cohn, Ferris, Glovsky and Popeo, P.C.; Paul S. Brockland

(57) ABSTRACT

Sports simulations may include sports nodes providing a user interface for players to participate in a sports simulation. A user interface for a player to interact with a sports service may be hosted on a computing device. The sports service providing the sports simulation game may be hosted on a server. The user at the user interface of the computing device may interact with the sports service via a network and/or the Internet. Multiple players may interact on their computing devices with the sports service. The multiple players may interact in one simulation, or may interact in multiple simulations, or may each interact with the sports service in solo simulations. Players may be matched in pairs where each pair plays a simulation to determine a winner.

20 Claims, 14 Drawing Sheets

HALL OF FAME
RUNNING BACKS
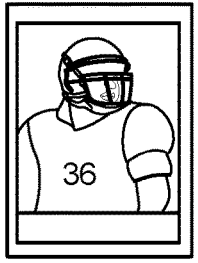 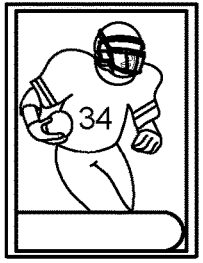   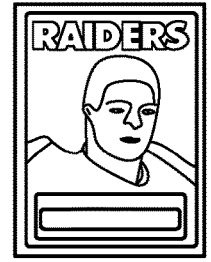 
| Jerome Bettis | Earl Campbell | Jimmy Brown | Larry Csonka | Marcus Allen |
|---|---|---|---|---|
| RB | RB | FB | RB | RB |
WIDE RECEIVERS
 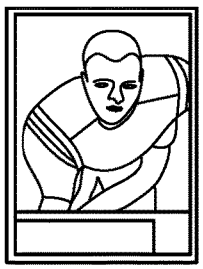 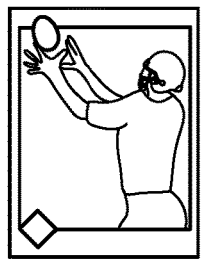  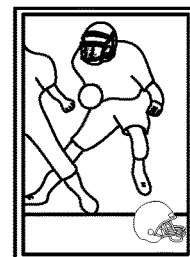 
| Lance Alworth | Ray Berry | Cris Carter | Fred Biletnikoff | Tim Brown |
|---|---|---|---|---|
| WR | WR | WR | WR | WR |
QUARTER BACK
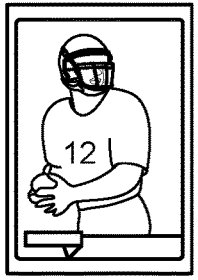  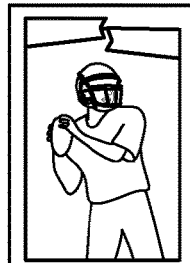 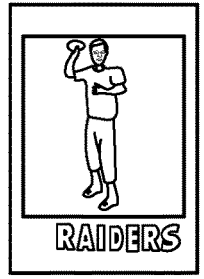 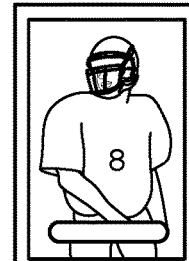 
| Terry Bradshaw | Len Dawson | John Elway | George Blanda | Troy Aikman |
|---|---|---|---|---|
| QB | QB | QB | QB | QB |
FIG. 2

Hall of Fame Mystery Box:
QB             WR             RB
 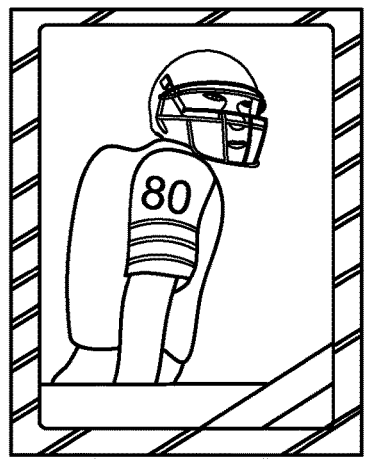 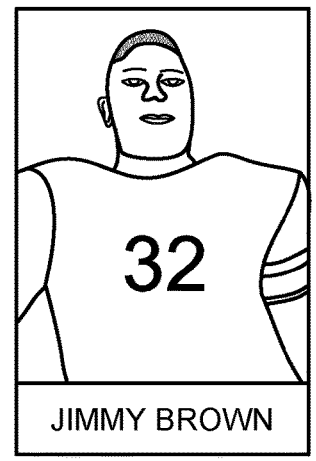
FIG. 4
Hall of Fame Kicker:
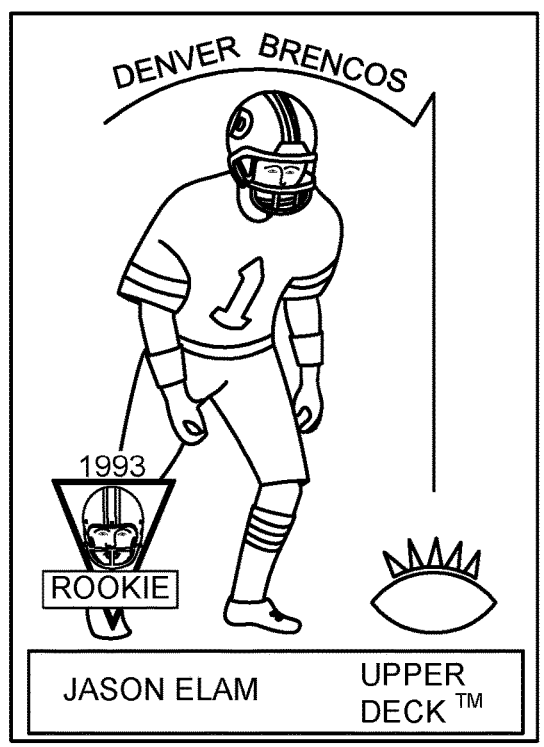
FIG. 5

Quarterback for the Wag Skins

600

STEELERS

Terry Bradshaw
Pittsburg Steelers
1970-1983
Historical Game:

Baltimore Colts, December 19, 1976

605 { Total Yards 264
Touchdowns 3
Receptions 0

610

Fantasy Points: 54.4

Results Game 48
Owner: Wags
Team Name: Wag Skins

| Player | Random Game Date | Opponent | Yards | TDS | Receptions | Fantasy Points |
|---|---|---|---|---|---|---|
| Joe Namath | 09/21/1970 | Browns | 298 | 1 | 0 | 44.8 |
| Lynn Swann | 10/23/1977 | Oilers | 71 | 0 | 5 | 12.1 |
| John Riggins | 10/27/1985 | Browns | 112 | 1 | 2 | 24.2 |
| Terry Bradshaw | 12/19/1976 | Colts | 264 | 3 | 0 | 54.4 |
| Jim Brown | 10/3/1965 | Eagles | 158 | 3 | 2 | 40.8 |
| Jerry Rice | 11/20/1994 | Rams | 168 | 3 | 16 | 55.8 |
| Total Points | | | | | | 232.1 |
| Optional Kicker | Yardage | Game Date | Opponent | Made / Missed | | Multiplier |
| Jason Elam | 40 yarder | 10/18/93 | Raiders | Made | | 4X |
| Grand Total | | | | | | 9284 |

Leader Board (11,282)  Total Points  Game Average
1. Wag Skins       12,945    980
2. Lambs           11,456    956
3. Can't Wait      11,234    1100
4. Iron Men        11,989    841

FIG. 7

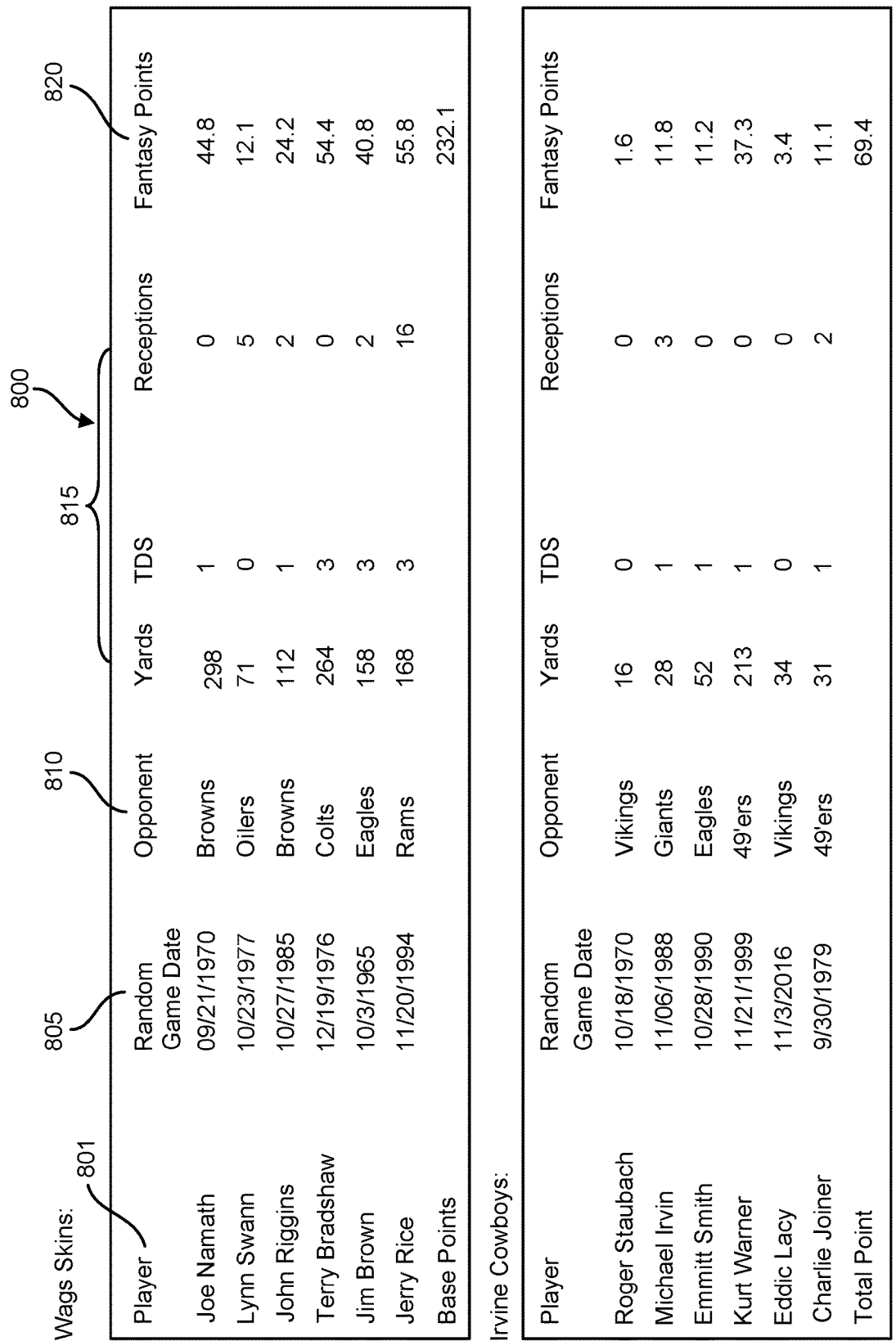

Wags Skins: 801

| Player | Random Game Date | Opponent | Yards | TDs | Receptions | Fantasy Points |
|---|---|---|---|---|---|---|
| Joe Namath | 09/21/1970 | Browns | 298 | 1 | 0 | 44.8 |
| Lynn Swann | 10/23/1977 | Oilers | 71 | 0 | 5 | 12.1 |
| John Riggins | 10/27/1985 | Browns | 112 | 1 | 2 | 24.2 |
| Terry Bradshaw | 12/19/1976 | Colts | 264 | 3 | 0 | 54.4 |
| Jim Brown | 10/3/1965 | Eagles | 158 | 3 | 2 | 40.8 |
| Jerry Rice | 11/20/1994 | Rams | 168 | 3 | 16 | 55.8 |
| Base Points | | | | | | 232.1 |

Irvine Cowboys:

| Player | Random Game Date | Opponent | Yards | TDs | Receptions | Fantasy Points |
|---|---|---|---|---|---|---|
| Roger Staubach | 10/18/1970 | Vikings | 16 | 0 | 0 | 1.6 |
| Michael Irvin | 11/06/1988 | Giants | 28 | 1 | 3 | 11.8 |
| Emmitt Smith | 10/28/1990 | Eagles | 52 | 1 | 0 | 11.2 |
| Kurt Warner | 11/21/1999 | 49'ers | 213 | 1 | 0 | 37.3 |
| Eddic Lacy | 11/3/2016 | Vikings | 34 | 0 | 0 | 3.4 |
| Charlie Joiner | 9/30/1979 | 49'ers | 31 | 1 | 2 | 11.1 |
| Total Point | | | | | | 69.4 |

| | Kicker | Yardage | Game Date | Opponent | Result | bonus | Base | Total |
|---|---|---|---|---|---|---|---|---|
| | 901 | 902 | 905 | 910 | 912 | 915 | 918 | 920 |
| Wag Skins | Lowery | 47 | 11/2/80 | Raiders | miss | 4x | 232.1 | 232.1 |
| Irvine Cowboys | Stenerud | 52 | 11/15/70 | Stealers | made | 5x's | 69.4 | 347 |

Winner Irvine Cowboys

FIG. 10 (1000)

| | Total Points | Game Average | Footballs |
|---|---|---|---|
| | 1005 | 1010 | 1015 |
| Leader Board (11,282) | | | |
| 1. Wag Skins | 12,945 | 980 | 25 |
| 2. Lambs | 11,456 | 956 | 15 |
| 3. Can't Wait | 11,234 | 1100 | 32 |
| 4. Irvine Cowboys | 11,989 | 841 | 10 |
| 5. Karma | 11,544 | 852 | 16 |
| 6. Hoodrats | 10,433 | 901 | 22 |
| 7. Kordell | 10,356 | 887 | 28 |
| 8. Horn Frogs | 9,987 | 881 | 5 |

(1001)

Adam Vinatieri

New England Patriots vs Oakland Raiders

January 19, 2001

48 Yard Attempt

Snow Covered Field

FIG. 11

Instant Fantasy Football Slots

Select Any Player in HISTORY from the NFL!

Roger Staubach!     Terry Bradshaw!
Jim Brown!     Joe Montana!

Barry Sanders!

3 TD Super Jackpot *

Payout:

$ 500,000

* All Selected Players Must Score Exactly 3 TD's Each

Payouts:

| Points | Payout |
|--------|--------|
| 0-50   | 0      |
| 50-60  | 2:1    |
| 60-70  | 3:1    |
| 70-80  | 4:1    |
| 80-90  | 5:1    |
| 90-100 | 6:1    |
| 100+   | 100:1  |

Spin Reel for results from an actual past game!
| | YARDS | TD's | Receptions | Fantasy Points |
|---|---|---|---|---|
| Terry Bradshaw vs Colts<br>December 19, 1976 | | | | |
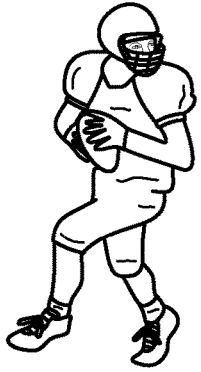
| | 264 | 3 | 0 | 44.4 |
|---|---|---|---|---|
Jim Brown vs Eagles
October 3, 1965
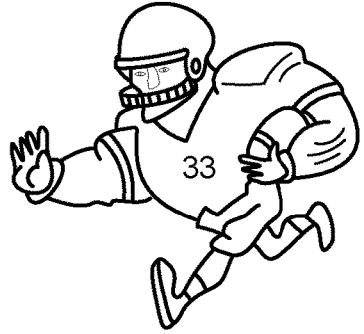
| | 158 | 3 | 2 | 35.8 |
|---|---|---|---|---|
Jerry Rice vs Rams
November 20, 1994
| | 168 | 3 | 16 | 50.8 |
|---|---|---|---|---|
FIG. 13

TOTAL SCORE: 131
WIN: $131

BONUS KICK
DOUBLE PAYOUT!
Hit Kick to Double Payout
Unlimited Kicks!
Double or Nothing Mark Mosely 49 Yards MADE!
(Player's winnings double to $262)

INSTANT AND HISTORICAL FANTASY SPORTS

CROSS REFERENCE TO RELATED APPLICATIONS

This application claims the benefit of U.S. Provisional Patent Application No. 62/394,997 filed on Sep. 15, 2016, entitled "INSTANT AND HISTORICAL FANTASY SPORTS," the disclosures of which are incorporated herein by reference in their entireties.

TECHNICAL FIELD

The subject matter described herein relates to a system for providing sports gaming.

BACKGROUND

Sports simulations involve virtual teams of real athletes where the athletes' actual performance/statistics are used in simulated competitions with other virtual teams. With the expansion of the Internet and portable computing devices, multiple simulations can involve players in different locations using a variety of devices.

SUMMARY

Sports simulations may include sports nodes providing a user interface for players to participate in a sports simulation. A user interface for a player to interact with a sports service may be hosted on a computing device. The sports service which provides the sports simulation may be hosted on a server. The user at the user interface of the computing device may interact with the sports service via a network and/or the Internet. Multiple players may interact on their computing devices with the sports service. The multiple players may interact in one simulation, or may interact in multiple simulations, or may each interact with the sports service in solo simulations. Players may be matched in pairs where each pair plays a simulation to determine a winner.

Systems and methods consistent with this approach are described as well as articles that comprise a tangibly embodied machine-readable medium operable to cause one or more machines (e.g., computers, etc.) to perform one or more of the operations described herein. Similarly, computer systems are also described that may include a processor and a memory coupled to the processor. The memory may include one or more programs that cause the processor to perform one or more of the operations described herein.

A method for playing and determining a winner of a fantasy sports game played on computer implemented application is disclosed. The method includes creating a fantasy team having a plurality of players corresponding to one or more positions of a professional sports league, wherein the plurality of players comprise players in the professional sports league. The method further includes generating statistical information associated with each player of the plurality of players on the fantasy team. Wherein the generating includes, for each player of the plurality of players: selecting a random game, the random game comprising a historical game played by the player, the random game being different for each player. The generating further includes retrieving statistical information for the random game, the statistical information associated with the player. The generating further includes calculating a total player score for the player based on the retrieved statistical information associated with the player. The method further includes calculating a first fantasy team score by adding together the total player score for each player of the fantasy team.

A fantasy sports game system is also disclosed. The system includes a node configured to act as a client on a network. The system further includes a server configured to communicate with the node over the network. The server includes at least one programmable processor and a machine-readable medium storing instructions that, when executed by the at least one programmable processor, cause the at least one programmable processor to perform operations. The operations include creating a fantasy team having a plurality of players corresponding to one or more positions of a professional sports league, wherein the plurality of players comprise players in the professional sports league. The operations further include generating statistical information associated with each player of the plurality of players on the fantasy team. Wherein the generating includes, for each player of the plurality of players: selecting a random game, the random game comprising a historical game played by the player, the random game being different for each player. The generating further includes retrieving statistical information for the random game, the statistical information associated with the player. The generating further includes calculating a total player score for the player based on the retrieved statistical information associated with the player. The operations further include calculating a first fantasy team score by adding together the total player score for each player of the fantasy team.

A computer program product comprising a non-transitory machine-readable medium storing instructions that, when executed by at least one programmable processor, cause the at least one programmable processor to perform operations is disclosed. The operations include creating a fantasy team having a plurality of players corresponding to one or more positions of a professional sports league, wherein the plurality of players comprise players in the professional sports league. The operations further include generating statistical information associated with each player of the plurality of players on the fantasy team. Wherein the generating includes, for each player of the plurality of players: selecting a random game, the random game comprising a historical game played by the player, the random game being different for each player. The generating further includes retrieving statistical information for the random game, the statistical information associated with the player. The generating further includes calculating a total player score for the player based on the retrieved statistical information associated with the player. The operations further include calculating a first fantasy team score by adding together the total player score for each player of the fantasy team.

The details of one or more variations of the subject matter described herein are set forth in the accompanying drawings, and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 illustrates an exemplary illustration of a list of NFL players that an owner may select from, in accordance with embodiments described herein;

FIG. 4 illustrates an exemplary screen shot of the IFS application after an owner has received a mystery box, in accordance with embodiments described herein;

FIG. 5 illustrates an exemplary screen shot of the IFS application after an owner has received or selected a kicker, in accordance with embodiments described herein;

FIG. 7 illustrates an exemplary scoreboard showing an owner's final score and a leaderboard, in accordance with embodiments described herein;

FIG. 8 illustrates an exemplary scoreboard showing a head-to-head score, in accordance with embodiments described herein;

FIG. 9 illustrates an exemplary scoreboard showing a head-to-head score after a kicking bonus round, in accordance with embodiments described herein;

FIG. 10 illustrates an exemplary leaderboard, in accordance with embodiments described herein;

FIG. 11 illustrates an exemplary screen shot from the IFS application showing kicker information, in accordance with embodiments described herein;

FIG. 13 illustrates an exemplary screen shot of an IFS application on a slot machine after a user has pulled or activated the slot machine, in accordance with embodiments described herein;

When practical, similar reference numbers denote similar structures, features, or elements.

DETAILED DESCRIPTION

Figure 1:
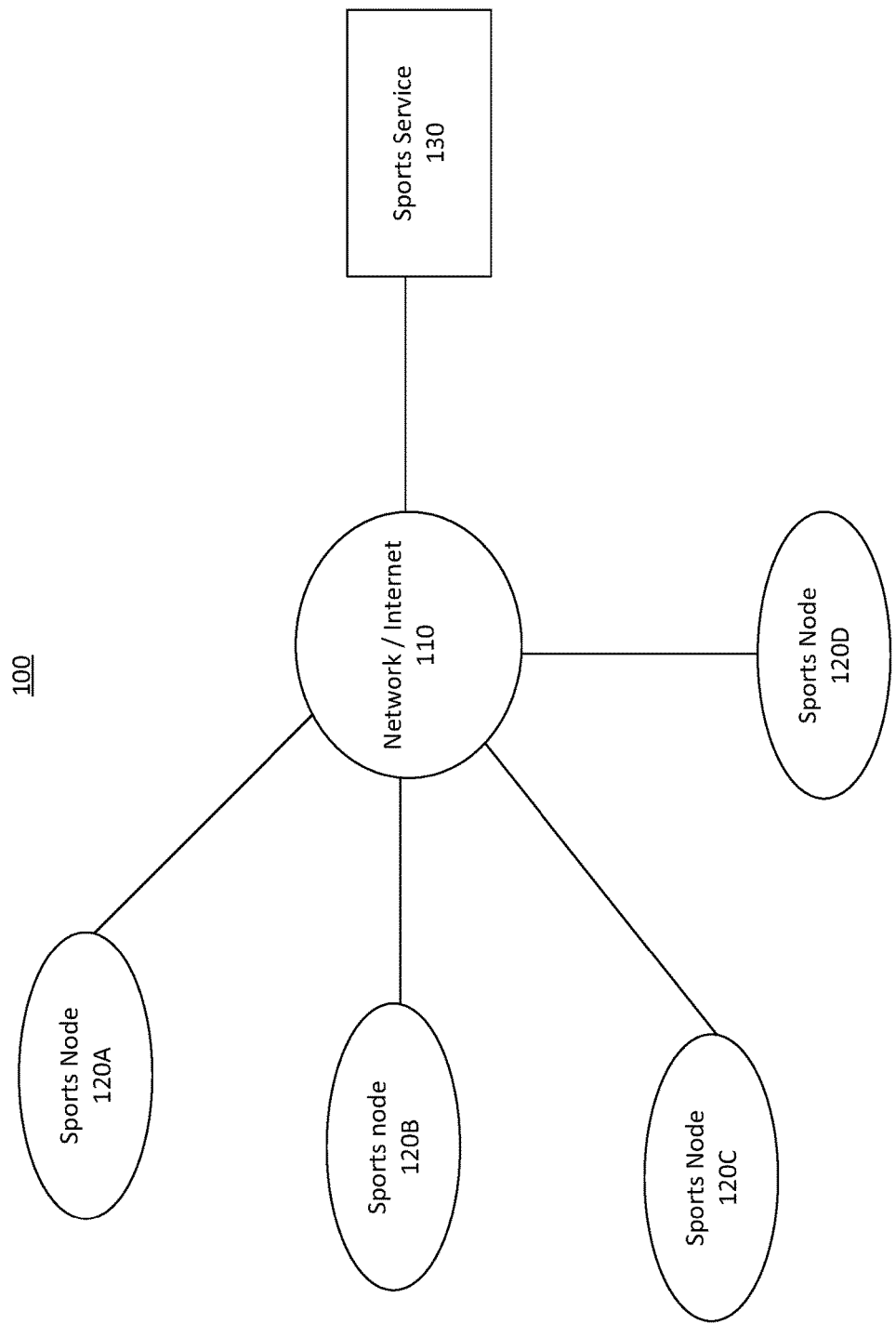
FIG. 1 depicts a sports simulation system, in accordance with some example embodiments.

Sports simulations may include sports nodes providing a user interface for players to participate in a sports simulation. A user interface for a player to interact with the sports service may be hosted on a desktop computer, laptop commuter, notebook computer, netbook, personal digital assistant, smartphone, and/or any other computing device. The sports service providing the sports simulation may be hosted on a server. The user at the user interface of the computing device may interact with the sports service via a network and/or the Internet. The user interface may be a dedicated sports service application (also referred to as an "ap" or "app"), or the user interface may be web based and accessed via a web browser. Multiple players may interact on their computing devices with the sports service. For example, one of the multiple players may access the sports service on their smartphone using the dedicated app, another player may access the sports service on their netbook via a web browser, and another player may access the sports service on their desktop computer via a web browser. The multiple players may interact in one simulation, or may interact in multiple simulations, or may each interact with the sports service in solo simulations. Players may be matched in pairs where each pair plays a simulation to determine a winner. A user's computing device and the sports ap or web browser configured to interface with the sports service may be referred to as a sports node.

Players of the sports service may connect from their sports nodes to the sports service through a wired or wireless network interface included in their computing device and a network and/or the Internet. Messages may be passed from the user interfaces at the sports nodes to the sports service. The messages may include data packets containing information related to the sports simulation such as athlete (e.g. football player, basketball player, etc.) information including historical play and/or statistical information regarding the athlete. The messages may contain financial information such as subscription, sports service account information, or wagering information including credit card and/or banking information. The messages may be encrypted to ensure privacy. For example, messages to a particular user's computing device may be encrypted using the Internet Protocol address of that particular computing device as an encryption key. Using an encryption key known to the user's computing device but not other players computing devices allows the user's computing device to decrypt the message without having a key passed from the sports server to the user's computing device. Other possible encryption keys include encrypting the message based on a user name and/or password or applying a hash function to the login, password, IP address, and/or other information to generate an encryption key. In some example embodiments, a player may be required to wait for another player to make a decision such as a play decision or team selection decision. An electronic token may be passed to the sports node where the corresponding player needs to make a decision. The other players may wait for the deciding player before they can make a play decision. When the player with the token makes the decision, that deciding player's sports node may pass the token to another player's sports node to make the next decision. In this way, the token identifies from which sports node the simulation is waiting for a decision and prevents collisions of decisions from sports nodes of players making simultaneous or near-simultaneous decisions. Simultaneous or near-simultaneous decisions may cause confusion and/or uncertain simulation results.

A sports service performing a multiplayer sports simulation may interface through a network and/or the Internet to the multiple sports nodes and corresponding players. The simulation may include multiple simulation steps where each player may make decisions about the athletes used on their team and the next simulation move or play for their team. In order to execute multiple simulation steps quickly so that the simulation players stay engaged, the sports service, network/Internet, and sports node browsers/aps may be required to provide a predetermined quality of service (QoS). The QoS may include a maximum latency, minimum data rate, and/or maximum or minimum packet size for sports service messages. The quality of service parameters may be passed from the sports server to the network and/or to the individual sports nodes.

FIG. 1 depicts a sports service 130 connected through a network/Internet 110 to one or more sports nodes 120 operating in one or more simulations. In the example of FIG. 1, four sports nodes 120A, 120B, 120C, and 120D may connect through network/Internet 110 to a sports service 130 hosted on a server. Although FIG. 1 depicts four sports nodes, any other number of sports nodes may connect through network/Internet 110 to sports service 130. In the example of FIG. 1 sports node 120A may be matched with sports node 120D for a simulation and sports node 120B may be matched with sports node 120B for a simulation.

Sports nodes 120A-D may include any type of computing device such as a desktop computer, laptop computer, notebook computer, personal digital assistant, netbook, smartphone, or any other computing device. Sports nodes 120A-D may include web browsers or specific applications to interface with the sports service 130. Sports nodes 120A-D may include a user interface screen and a method of user input. Sports nodes 120A-D may include one or more wired or wireless interfaces that may interface with network/Internet 110. Wired interfaces may include a universal serial bus interface, Ethernet interface, or any other wired interface. Wireless interface may include WiFi (any of the IEEE 802.11 family of standards), WiMAX (any of the IEEE 802.16 family of standards), Bluetooth, cellular 2G/3G/4G/5G/GSM interface, or any other wireless interface.

Network/Internet 110 may include any combination of wired and wireless interfaces that route messages from the sports nodes 120A-D to sports service 130.

Sports service 130 may include executable instructions or software running on a server. The sports service 130 may provide a web interface for the sports nodes 120A-D and may provide an interface for a sports service application that may be installed on one or more of the sports nodes. The sports service may include an interface for management of the sports service such as establishing and/or deleting or suspending user accounts. The sports service 130 may provide data encryption for messages passed to and/or from the sports nodes and may support tokens as described above. Sports service 130 may include a database of athletes in one or more sports.

The sports service 130 may include detailed information about the historical performance of athletes, teams, managers, coaches, or the like. For example, a sports service directed at football may include all athletes that played the game between predetermined years, or a subset of players. For example, a football sports service may include all football players that played between 1960 and 2015. Associated with each player may be performance metrics or a history of the plays made by the players. For example, information about the players may include yards rushed, number of touch downs, tackles, field goals, and distances, and so on.

The manager or owner of the team (user at a sports node) may select player lineups and which plays may be run in the simulation. In some example embodiments, a simulation involves managing and/or coaching a team roster, and/or calling plays and making strategic decisions. In some example embodiments, a simulation involves utilizing the athletes' actual performance.

Fantasy sports is the concept of creating virtual teams of real athletes and using their actual performance/statistics to compete with other virtual teams. Fantasy sports may be seasonal competitions with a draft to select players from professional sports teams create individual fantasy sport teams as part of a fantasy sports league. Leagues may be formed amongst friends, co-workers, and acquaintances online with drafts occurring prior to the start of a professional sports season.

Formats include, but are not limited to, head to head leagues with a playoff structure and championship games and total point leagues. Teams are managed during the year, players added and dropped, injured players are lost and rookies/sleepers are given chances to fill rosters.

Fantasy leagues may include an annual draft, a process for "managing" your team during the professional sport's season and league competition. Leagues often use straight round robin drafts or have "auction" style drafts where team owners are given a set virtual salary and bid on individual players.

One issue a player may have with fantasy sports is having an "off-year" (e.g., a poor draft or bad luck with player injuries). Owners stay may active in their current league, but can't wait until the following years draft to redeem themselves.

"Daily Fantasy Sports" is an accelerated version of fantasy sports. Players enter into daily contests where they select new teams and/or new players for every weekend or night and are not tied to an annual draft.

All leagues may be web-based and can be daily, weekly, or head to head matches, basically any variation a player wants. Owners may pay an entry fee per contest or league then use a virtual budget to draft players with pre-set salaries to fill their rosters. They may compete with other online competitors in leagues and matches with as few two players, to hundreds of thousands in one contest. This may enable high payouts to winners, and in some contests, 50% of participants may receive a payout.

Sports simulations may involve detailed research and management of teams based on a player's historical performance and future potential to create simulated games. In sports simulations a manager "manages" the team, starting lineups, what plays to run, etc. in simulated games. Simulation sports is about playing a simulated game and managing/coaching a roster, calling plays and making strategic decisions. While fantasy sports are built around a player's actual performance, simulated sports are built around playing a simulated game.

Both fantasy sports and daily fantasy sports include selecting teams and playing games to generate results to populate the competition. Sports simulation may involve playing simulated games to achieve results, where fantasy sports may focus on the results of actual games played.

Instant fantasy sports (IFS) simulations utilize teams set using current or retired athletes for an "instant" game using historical data. Once athletes are selected, "stat-lines" for those athletes may be generated from random dates in that player's history. Those point totals may then be used in simulation and/or simulation results. IFS may enable players to choose a player from history including a childhood sports hero, a sports legend, and/or hall of famers. The outcome of an IFS game may depend on a combination of skill and chance. The historical game used for each athlete for each play of a simulated game may be selected randomly or according to an algorithm.

A game may include both historical fantasy sports and instant fantasy sports. A participant in the game may select current players and/or teams as well as historical players and/or teams. When a game is played in real-world time the computer system can be configured to run an algorithm to determine the performance of the historical players based on their historical data. The results based on the determined performance of the historical players and/or teams can be combined with the real-world performance of current players and/or teams. Providing fantasy sports that is an augmentation of historical and current players and/or teams adds a new dimension to fantasy sports games. While this concept can be used for any fantasy sport, for illustration purposes, the rest of this disclosure will use fantasy football as an example of potential application of the Instant Fantasy Sports concept.

In some implementations, IFS game play may be similar to traditional fantasy sports. For example, IFS fantasy football owners may draft players of historical and/or current professional football teams to form a team comprising the drafted players. For each game, the owners may select players from their roster to play for a given contest, match, game, week, etc. Owners may play in head-to-head games or leagues. Also, owners may play in total points games or leagues. Such games or leagues may be against one or more other individuals and/or computer simulations or computer selected teams. As described above, the results of the IFS game can be based on the determined performance of the historical players and/or teams for a randomly generated historical game and the real-world performance of current players and/or teams playing in a current week.

In some aspects, an IFS fantasy football game may include an individual play option. Individual team owners draft players to fill a roster of their team. The number and type of players on a roster may depend on the settings for the game or league. For example, an IFS fantasy football roster may comprise 6 players; 2 Quarterbacks (QBs); 2 Running Backs (RBs); and/or 2 Wide Receivers (WRs), however other positions and numbers of players are possible. In the following description, owners may refer to IFS game players, and players may refer to a sports team players such as football team players. To fill a roster, owners may select one player for each position. Owners may select players from a list of former and/or current NFL players.

FIG. 2 is an exemplary illustration of a list of NFL players that an owner may select from, in accordance with embodiments described herein. As shown in FIG. 2, the list comprises members of the NFL Hall of Fame at the positions of quarterback, running back, and wide receiver. In some aspects, after selecting one or more players, the owner may receive a random "mystery box" containing one or more players. In some embodiments, the number of players in the mystery box can equal the number of players needed to fill the owner's roster.

Figure 3:
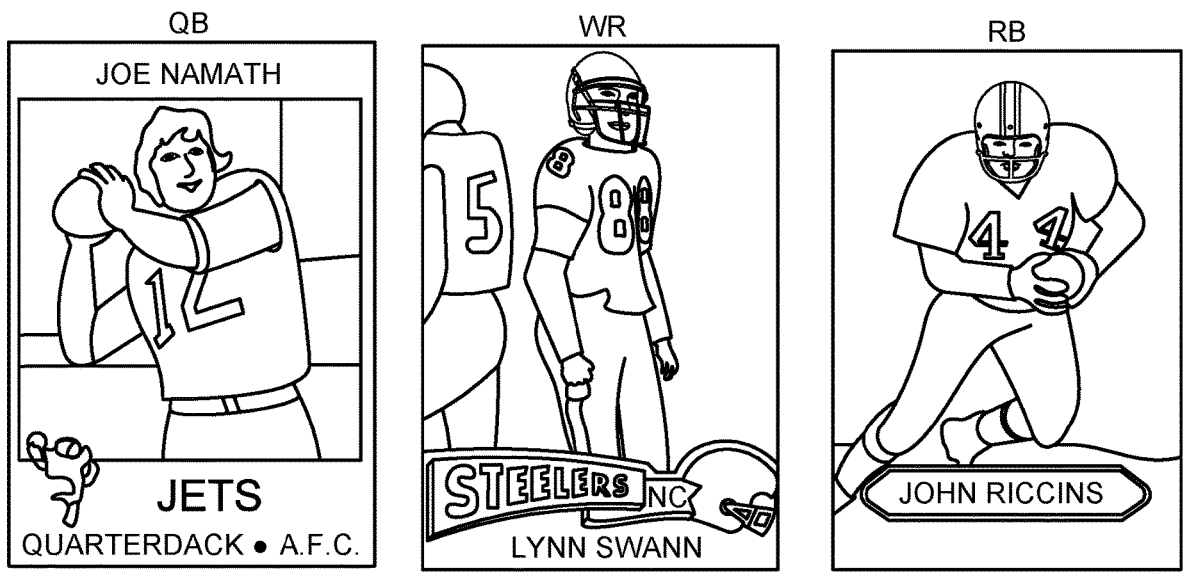
FIG. 3 illustrates an exemplary screen shot of an Instant Fantasy Sports (IFS) application after an owner has selected the three players, in accordance with embodiments described herein.

For example, the owner may select 3 players, 1 QB, 1 RB, and 1 WR. FIG. 3 illustrates an exemplary screen shot of the IFS application after an owner has selected the three players, in accordance with embodiments described herein. After selecting the 3 players, the owner may receive a mystery box comprising 3 players (e.g., 1 QB, 1 RB, and 1 WR) required to complete the roster. In some implementations, owners may receive a statistically better mystery box by purchasing a higher-level box, as described below. FIG. 4 illustrates an exemplary screen shot of IFS application after an owner has received a mystery box. In the example of FIG. 4, the owner has received and/or purchased a Hall of Fame mystery box comprising NFL Hall of Fame players for each position, in accordance with embodiments described herein.

In a non-limiting example, an IFS fantasy football game may comprise two rounds of drafting for selecting players for a team. In one aspect, during the first round, an owner selects one quarterback, one running back, and one wide receiver from any player from the modern NFL era. Players from the modern NFL era can comprise any player former or current NFL player. This enables owners to select childhood heroes, their favorite players, legends of the game, and current players.

In some aspects, the set of players available for an owner to select may be filtered or determined based on a number of factors. In some embodiments, the IFS fantasy football game or league settings may require that a given NFL player play a minimum number of games. For example, Lionel Vital was a replacement player for the Washington Redskins during the 1987 NFL strike. He only played three games, rushing for 82, 128 and 136 yards in each game. This gives him the highest per game average in the history of the NFL, with a 66% chance of having a 100-yard game. It may be beneficial for an owner to start him in every match up. However, it may be desirable to limit the number of players available for selection by certain criteria, including number of games played. In other aspects, players such as Lionel Vital may be included in the set of players eligible to be selected. Additionally, such players may be used as a wild card or a "bonus" card. In some implementations, the IFS fantasy football game may include a setting or prompt a user to select whether to include such players or select a criteria/filter for determining which players are available for selection on a team.

In the second round, owners can receive a mystery box containing 3 completely random players from the NFL archives to fill their 6 man roster. This may consist of 1 quarterback, 1 running back and/or 1 wide receiver. In some aspects, if owners do not want a random mystery box, they may have the option of purchasing two or more different levels of "mystery boxes" to complete their roster. For example, the owner may have the option of three different levels of mystery boxes. The different levels may comprise a Hall of Fame mystery box, a Super All Pro Mystery Box, and an All Pro mystery box. The Hall of Fame mystery box may comprise players who members of the NFL Hall of Fame, the Super All Pro Mystery Box may comprise players who were All Pro players multiple times, and the All Pro mystery box may comprise players who have been to a Pro Bowl at least one time. If a mystery box contains a player already on the owner's team, the stats for that player may be doubled for point total or the owner may receive a replacement card.

Scoring for an IFS fantasy football game may be determined by a game or a league setting. In some aspects, the user may select the desired scoring setting or a default scoring setting may be set. An example scoring system may include awarding points for yards gained. For example, 1 point per 10 yards passing, rushing or receiving, 5 point bonus for 100 yard plus game, 10 point bonus for 200 yard game, etc. Additionally players may be awarded points for touchdowns (e.g., 6 points per touchdown), receptions (e.g., 1 point per reception and 5 bonus points for a 10+ reception game). Similar scoring may apply to other sports, awarding points for different statistics. For example, IFS fantasy baseball scoring may be based on batting average, home runs, runs batted in (RBIs), stolen bases, etc. Additionally IFS fantasy basketball scoring may be based on points scored, rebounds, assists, etc.

After an owner's team roster has been determined, the owner may then select to play a game. In some aspects, the owner may select a "play" button on the sports service application or game console to initiate a game. In response to starting a game, the IFS fantasy football application may generate and reveal random real historical game statistics for each player. This may be a slow reveal so the owner and other players can "experience" the stats being revealed. For example, the statistics may be revealed over a period of time corresponding to the real games played. In some aspects, the statistics may be revealed all at once for all players or may be revealed one by one for each player on the owner's roster.

Figure 6:
FIG. 6 illustrates an exemplary screen shot of a reveal screen on an IFS application, in accordance with embodiments described herein.

FIG. 6 illustrates an exemplary screen shot of a reveal screen 600 on an IFS application, in accordance with embodiments described herein. As shown, the reveal screen 600 includes the player's name, the historical game played, statistics 605 for the historical game, and total fantasy points 610 awarded to the player for that game. The historical game may include the opponent and the date the game was played. The statistics for the historical game may include the total number of yards gained, touchdowns, and receptions for the individual player. In some embodiments, the owner may be shown a reveal screen for each player on the owner's roster or may receive a reveal screen with all the players statistics and fantasy point totals on one screen.

In some aspects, if a current NFL player is on the owner's roster, then the statistics for that player may be revealed as the current NFL game is played. The statistics from that game may be populated into the owners score for that game. The owner's team stats and corresponding fantasy points may be calculated and totaled as the games are played and a final base score may be determined once all games for all players are completed.

In some embodiments, after the final base score is determined, the IFS fantasy football game may include a kicking bonus. In some aspects, a kicker may be added the owner's team for a chance at a bonus. Owners may be randomly assigned a kicker or may purchase a random or individual Hall of Fame, Super All Pro, or All Pro kicker. FIG. 5 illustrates an exemplary screen shot of the IFS application after an owner has received or selected a kicker, in accordance with embodiments described herein. In the example of FIG. 5, the owner has received a Hall of Fame kicker for the bonus. The concept of a kicking bonus may also apply to other sports. For example, a "half-court" bonus or "buzzer-beater" bonus in basketball corresponding to a player shooting from half-court or at the end of a historical game. In baseball, the bonus may comprise a "home run" bonus or other bonus determined from historical game statistics and situations.

In order to initiate the kicking bonus, the owner may select a "kick" button on the sports service application or game console to initiate the kicking bonus. In some aspects, the kicking bonus automatically occurs after the final base score is determined. In order to determine the kicking bonus, the IFS fantasy football game may reveal a random kick, from a random historical game. Owner receives a bonus multiplier of depending on the length of the kick. For example, the bonus may be 2× for kicks between 1-29 yards, 3× for kicks 30-39 yards, 4× for kicks 40-49 yards, and 5× for kicks over 50 yards.

An owner's final score may be calculated and ranked by total points (including the kicking bonus, if applicable) for the owner and average points per game. The ranking may be with respect to other players and/or computer generated scores. FIG. 7 illustrates an exemplary scoreboard 700 showing an owner's final score and a leaderboard 750, in accordance with embodiments described herein. The scoreboard 700 may comprise a column 701 indicating the players on the owner's team, a column 705 indicating the random historical game date, a column 710 indicating the opponent of the player for the historical game, columns 715 indicating the statistics for the player for the random historical game, and a column 720 indicating the total fantasy points awarded to the player for the random historical game. The scoreboard 700 may also include information for the kicking bonus. As shown, the scoreboard 700 comprises an optional kicker and statistics indicating the kick, including the kicker's name, the yardage of the random kick, the random historical game date, the opponent, whether the kicker made or missed the kick, and the bonus multiplier associated with the kick.

The leaderboard 750 may comprise a ranking of the owners for a league or contest. As shown, the leaderboard 750 comprises the team names of the owners, a column 755 indicating the total points for a team and a column 760 indicating the game average for that team. In some aspects, the leaderboard 750 may also indicate the total number of teams and/or owners in the league and/or contest.

The IFS fantasy football game application may also include options for head-to-head and/or group play. In some aspects, the roster of a team may have the same format as discussed above with respect to individual play (e.g., 6 man roster of 2 QBs; 2 RBs; and/or 2 WRs). Scoring for head-to-head and/or group options of a IFS fantasy football game may be determined by a game or a league setting. In some aspects, the scoring may be similar to the examples described above with respect to individual, total points games. In some embodiments, owners may receive points and/or bonuses for individual victories against other IFS fantasy football game opponents. For example, owners may win bonus "footballs," or other tokens, for victories. Footballs can be used to purchase mystery boxes at a discount. In some aspects, the number of footballs won may depend on the opponent, league, or contest the owner participates in.

For example, in a head-to-head matchup, an owner may receive 10 footballs for a victory and may be penalized (−2) footballs for a loss. In a group play league with 5 or less players, an owner may receive 20 footballs for a victory and may be penalized (−5) footballs for a loss. In a group play league with between 6-10 owners, an owner may receive 40 footballs for a victory and may be penalized (−10) footballs for a loss. In a group play league with 50 or more players, an owner may receive 100 footballs for a victory and may be penalized (−20) footballs for a loss. While specific numbers are described above, other combinations are possible.

Game play in head-to-head and/or group play may be accomplished in a variety of manners. In some aspects, an owner may wish to play in a head-to-head matchup. The owner may search for another user of the IFS application or may select to have the IFS application select another owner who wishes play in a head-to-head match. In some embodiments, an owner may wish to play in a group match and the IFS application may populate a group match with other owners seeking group play. Owners may also send challenges and/or invitations to one or more other owners for a head-to-head or group play. In some aspects, the challenge or invitation may be sent via an instant message on the IFS application, through an SMS text, or other communication network.

In some aspects, an owner can select favorite groups or individuals and/or favorite settings saved to the IFS application or owner profile for quick access. For example, an owner can select to send an invitation to a saved favorite group at a recurring time. In one example, the owner may send a recurring invitation to a group of friends to play an IFS game at lunch every day. Owners may also access information about past games and IFS opponents. In some implementations, an owner may send invitations to owners previously played or issue a challenge play against owners whose favorite NFL team is a rival of the owner's favorite NFL team.

Individual vs. Head to Head/Group Play may involve additional strategies. For example, if, after teams are selected and base scores are calculated, an owner is significantly behind in the match, the owner may be more likely to pay for a "Hall of Fame" kicker vs. taking a random kicker. Conversely, if the owner has a significant lead, the owner may be less likely to pay for an upgraded kicker. Another strategy may be to know the opponent's number of footballs, hence the likelihood of them purchasing a mystery box.

FIG. 8 illustrates an exemplary scoreboard 800 showing a head-to-head score, in accordance with embodiments described herein. As shown, the scoreboard 800 may comprise a column 801 indicating the players on each owner's team, a column 805 indicating the random historical game date, a column 810 indicating the opponent of the player for the historical game, columns 815 indicating the statistics for the player for the random historical game, and a column 820 indicating the total fantasy points awarded to the player for the random historical game.

In the example of FIG. 8, the Wags Skins team has a commanding lead and do not spend extra for a kicker in the kicking bonus round. FIG. 9 illustrates an exemplary scoreboard 900 showing a head-to-head score after a kicking bonus round, in accordance with embodiments described herein. The scoreboard 900 comprises a column 901 indicating the kicker, a column 902 indicating the yardage of the kick, a column 905 indicating the random historical game, a column 910 indicating the opponent, a column 912 indicating the result of the kick, a column 915 indicating the bonus multiplier, a column 918 indicating the base total score, and a column 920 indicating a final total score after factoring in the kicking bonus.

In the above example, since the Wags Skins team does not spend extra, they may randomly get Nick Lowery against the Raiders on Nov. 2, 1980 where he misses a 47 yarder, and therefore receive a zero multiplier. In the example of FIGS. 8 and 9, the Irvine Cowboys team is significantly behind and they pay for a higher quality kicker. They get Hall of Famer Jan Stenerud who kicks a 52 yarder against the Steelers on Nov. 15, 1970. In the above example, their score is multiplied by 5x, increasing their total score 347, beating the Wag Skins 232.

FIG. 10 illustrates an exemplary leaderboard 1000, in accordance with embodiments described herein. The leaderboard 1000 may comprise a column 1001 indicating a ranking of the owners for a league or contest. As shown, the leaderboard 1000 further comprises a column 1005 indicating the total points for a team, a column 1010 indicating the game average for that team, and a column 1015 indicating the number of footballs an owner has. In some aspects, the leaderboard 1000 may also indicate the total number of teams and/or owners in the league and/or contest.

Another embodiment of IFS fantasy football may include a "pay to play" option in the vein of arcade games. Participants may pay a fee and enter their teams on a bar top console, or other user interface. Once a minimum number of participants is met, the IFS game may begin. In some aspects, the pay to play option may be a standalone game for each site, may not linked to other sites, nor the app version of the game. In other aspects, users may be able to link their profile to the IFS game at the site. Participants may play for fun, bragging rights and name on the scrolling leaderboard.

Much like traditional arcade games, participants may pay at the console via coin, currency, credit card, or other electronic payment. In some embodiments, given the social setting of the venue, this version of IFS fantasy football may be simplified or may include the full version as described above. In a simplified version example, a participant may choose one QB, one RB and one WR each. Teams may be comprised of any NFL player from the modern era. In some aspects, the NFL players available may be limited to players who meet a minimum number of games played or other criteria.

Head-to-head games may commence once each participant pays and selects their team. Group Play may begin once between 3 and 10 participants enter teams. Group play may include other numbers of teams as well. After the players select a "play" button or otherwise initiate a game, each player's statistics may be revealed. As described above, the reveal may occur player-by-player, or all at once, or any combination of one or more players. After all players' statistics have been revealed, the IFS application determines a base final score for each team.

Each team can then choose to participate in a bonus round. The bonus round may include one kicker being revealed for the bonus kick. The kicker's name, length of field goal attempt, stadium and/or weather conditions may then be revealed prior to the kick. FIG. 11 illustrates an exemplary screen shot from the IFS application showing the above-described kicker information, in accordance with embodiments described herein.

In some aspects, before the kick information is revealed, each participant may decide whether to attempt the kick. Based on a result of the kick, the participant may receive a bonus or lose points. In some aspects, before the kick information is revealed, each participant may then either chose "make," "miss," or "stand." If the kick is made, participant's base score may be doubled or otherwise increased. If the kick is missed, their base score may be cut in half or otherwise decreased. If they choose "stand" the outcome of the kick does not matter, and their score stays the same. After selection of either "make," "miss," or "stand," an animation of the kick may be shown indicating whether the kicker made or missed the kick. Bonuses would then be applied, total scores would be calculated, and a winner declared.

Another embodiment of IFS fantasy football may include a slot machine option. In Individual Slot Machine play, a player may put money into the machine with a chance at winning money in return. What draws a person to a particular machine and their interaction while playing the game is unique. While adjusting how much a machine pays out may be legal, machines cannot be designed to "tease" a player. For example, a "near miss" at a jackpot must be an actual "near miss" it cannot be a programmed outcome designed to lure a player to play more. A machine cannot be programmed to "almost" hit the jackpot more frequently than any other outcome. Successful machines pull players into the machine with themes and interaction. While you can win just as much money on another machine "Wheel of Fortune" is one of the most popular slot machines simply due to the chance to "spin the wheel."

Figure 12:
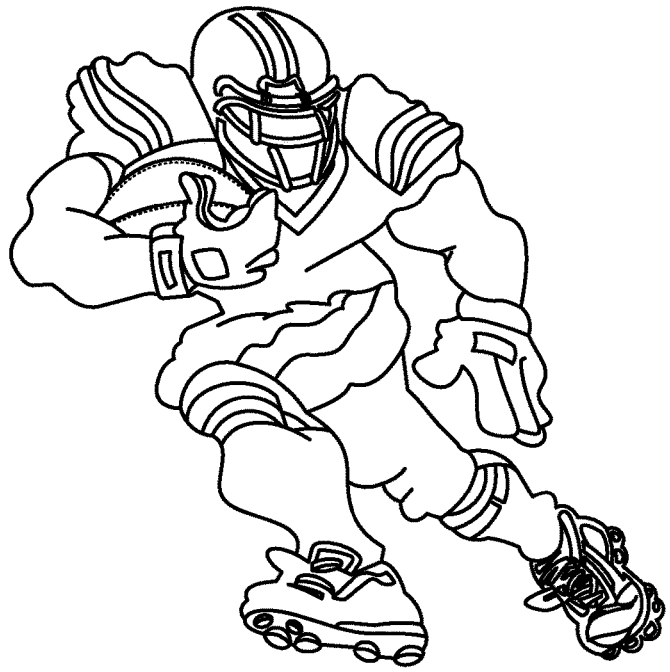
FIG. 12 illustrates an exemplary screen shot of an IFS application on a slot machine, in accordance with embodiments described herein.

An IFS slot machine may leverage the fantasy football fanatic affinity towards a fantasy football slot machine. While it would be clear that a user's choice of NFL player ultimately may not change the user's odds of winning, many users may be drawn to playing their favorite football players. For example, a Patriots fan may choose Tom Brady over Johnny Manziel, even if the odds of winning are exactly the same. The user's interaction with an IFS slot machine may also be a draw making the machine more popular. Players may carefully choose the "perfect" roster of NFL players before pulling the arm on machine. Such a roster may include Hall of Fame players and/or the user's favorite players. FIG. 12 illustrates an exemplary screen shot of an IFS application on a slot machine, in accordance with embodiments described herein.

In the IFS slot machine example, gamblers may select a team of 3-6 players from a scrollable or searchable database from a touch screen. Any player who ever played in the NFL can be selected or the number of players may be limited based on the number of games played. Gamblers can also search for players by categories such as Hall of Fame, All Pro, One Season Wonders, or specific pro teams. Odds and payouts can change depending on the amount of the bet and number of players selected.

Once users select their team, they pull the slot machine arm (or press the button). In some aspects, a whistle or noise or other indication indicates the beginning of the game. Next, the screen may display a kickoff. The IFS slot machine may then randomly pick an actual game from history for each player on the team. The IFS slot machine screen may display the game, including opponent, dates and stats for each player. FIG. 13 illustrates an exemplary screen shot of an IFS application on a slot machine after a user has pulled or activated the slot machine, in accordance with embodiments described herein.

Figure 14:
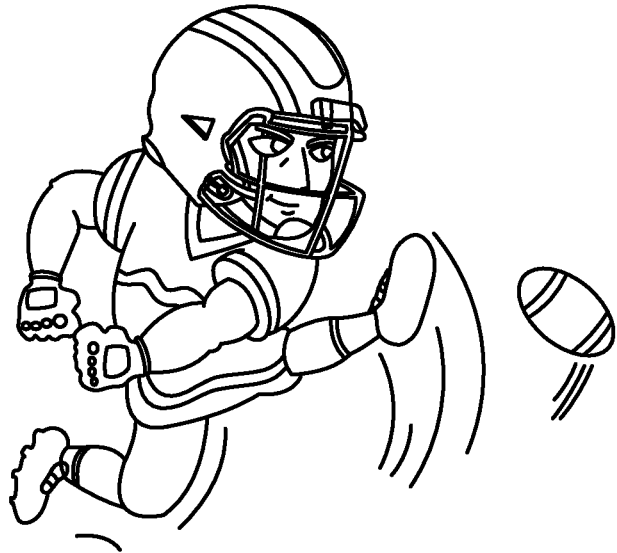
FIG. 14 illustrates an exemplary screen shot of an IFS application on a slot machine after a total score has been calculated and the user is presented with a kick bonus option, in accordance with embodiments described herein.

As shown in FIG. 13, the IFS slot machine screen may display total fantasy score for each player, which can correspond to a specific payout. A user of the IFS slot machine may be presented with an option to double, or otherwise increase, their winnings by selecting "kick." FIG. 14 illustrates an exemplary screen shot of an IFS application on a slot machine after a total score has been calculated and the user is presented with a kick bonus option, in accordance with embodiments described herein. If a user decides to try the kick bonus, the user may then press "kick". If kick is successful, winnings may be doubled or increase. If the kick is missed, the user may lose all of their winnings/credits. In some aspects, the user can keep attempting kicks until they either cash out or a kick is missed. In some aspects, a Super Jackpot can be won if selected players score 3 touchdowns each. Payouts and jackpots described above are exemplary, actual payouts may conform to casino's requested payout odds. The "3 TD Super Jackpot" is an example of a "jackpot event." NFL historical stats may be researched to find "unusual but possible" occurrences and Super Jackpots would be created accordingly.

Another embodiment of IFS fantasy football may include a table machine option. Successful table games have an appropriate house "edge" (5% is an industry benchmark), clear player rules, and are games players want to play. IFS table play may be a lucrative application. Instant Fantasy Football (IFF) may be a table game offered in casinos. Given the amount of data and millions of permutations, IFF may be a combination of a traditional table game and technology. Results may be generated using a database and an algorithm that includes odds information and a house edge. In contrast, most new table games involving dice or cards require extensive work and modeling from mathematicians. Instead of studying and understanding the odds of a new game, the odds may be decided and programmed into the algorithm.

The core of the IFF may remain the same as, or similar to, other forms of IFS described above. Participants may select players and form a team. The selected players are may then be randomly assigned fantasy statistics from an actual historical game. Those scores are converted to fantasy football points in competition with the "dealer" and other players at the table. Scoring may be the same as described above or may be set by the casino and/or dealer.

The betting procedure for an IFF table may depend on the stage of the game. In some aspects, players may place their "table" bet at, or over, the table minimum for betting against the house ("house bet"). Scores for each participant may be totaled. If they score more than the "house team" they may win an even money bet. If they score less, they may lose. If they tie, it may be a push. This may be the only mandatory bet to play the game.

If all three players on the participant's teams have the same number of TD's, the participant may have the option of doubling their bet. In some embodiments, players may place an optional bet at a "set" "head-to-head" amount. The player at the table (excluding the house team) with the highest score may win the "head to head" pot. In some aspects, there is not a house "rake" on this pot, but this bet may not be made without placing a house bet.

In other implementations, players may place an optional "side" bet at a chance for the Super Jackpot. If all three selected players score exactly 3 TD's each, player may win the cumulative table jackpot pool for that table. The jackpot pool for each table may be cumulative for all play at one table and remain in pool until a player gets the "Triple TD" bonus. The house may take a rake on the bonus pool.

After the base scores are revealed, participants may have the option of participating in a kicker round for an additional bet. Each participant who places this bet may then press a "kick" button or otherwise initiate the kick bonus. If the kick is good, the player's score is doubled for both the house bet and the head-to-head bet. If it is missed; the player's score remains the same. Additionally, in some embodiments, this side bet can be paid at even money if the kick is good and lost if the kick is missed.

Figure 15:
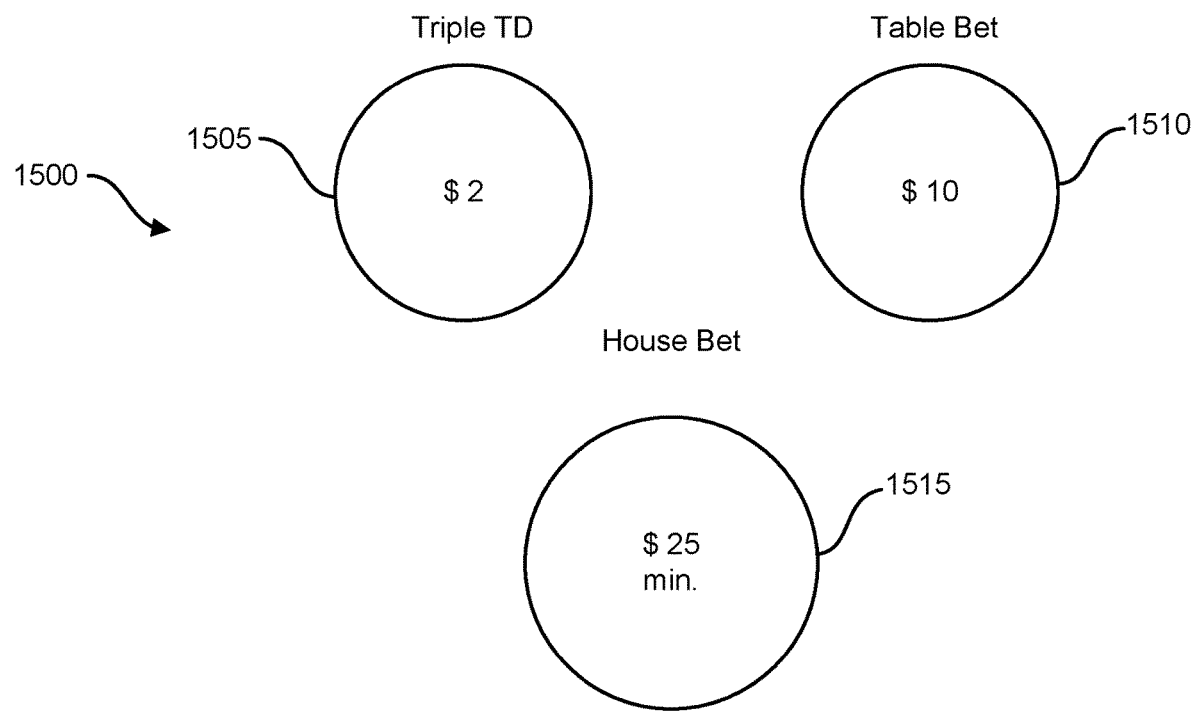
FIG. 15 illustrates an exemplary IFF table game comprising a house bet, a Triple TD bet, and a Table or Head-to-Head bet, in accordance with embodiments described herein.

FIG. 15 illustrates an exemplary IFF table game 1500 comprising a house bet 1515, a Triple TD bet 1505, and a Table or Head-to-Head bet 1510, in accordance with embodiments described herein. As shown in FIG. 15, the house bet is $25, the head-to-head bet is $10, and the Triple TD bet is $2. In some aspects, the IFF table game can be manned by a referee who serves as the table croupier/dealer. IFF tables can have one or more seats for players. In some aspects, the IFF tables may have 5 seats. In some embodiments, the referee may sound a short whistle or otherwise indicate the start of play. Then, the players may place their house bet, head-to-head bet, and/or Triple TD bet.

Table participants may select a team of one or more players. For example, a table participant may select of 3 players one QB, one WR and RB from a scrollable or searchable database from a touch screen, such as the exemplary screen shown in FIG. 2. From the touch screen, table participants may select players who played in the NFL. Participants can also search for players by categories such as Hall of Fame, All Pro, One Season Wonders or specific pro teams. In some aspects, table participants may have the option of having a random team selected for them. If table participants have not locked in a team within two minutes, or other specified amount of time, of the whistle, any open roster positions may be randomly filled.

After the team is selected, a second whistle is sounded, or a second indication is displayed/sounded. After the second whistle/indication, an NFL player's statistics for a random historical game can be revealed. In some aspects, the reveal may occur gambler by gambler with each QB's random game revealed with corresponding fantasy points, then WR's and finally RB's. The total team fantasy points may be calculated to generate a base score for a table participant's team. Once base scores are set, each table participant may have the option of a "Kicker Bet" to potentially double, or increase, their score. After all bets and scores are complete, the referee's team may be revealed and winners may be paid.

IFF table games may use various technologies for team selection and/or scoring. In some aspects, IFF table games may comprise gaming tables with consoles. These may be created by combining a traditional gaming table with a bar top video poker machines included in many casino bars. "Live referees" may man the tables and bets could be made with casino chips. In some aspects, IFF table games may be implemented by "virtual" attendants at electronic tables. For example, bets can be made on gaming console machines with a virtual attendant acting as the referee/dealer. In other aspects, IFF table games may be implemented on fully electronic machines similar to fully electronic craps, roulette, and/or blackjack machines.

Figure 16:
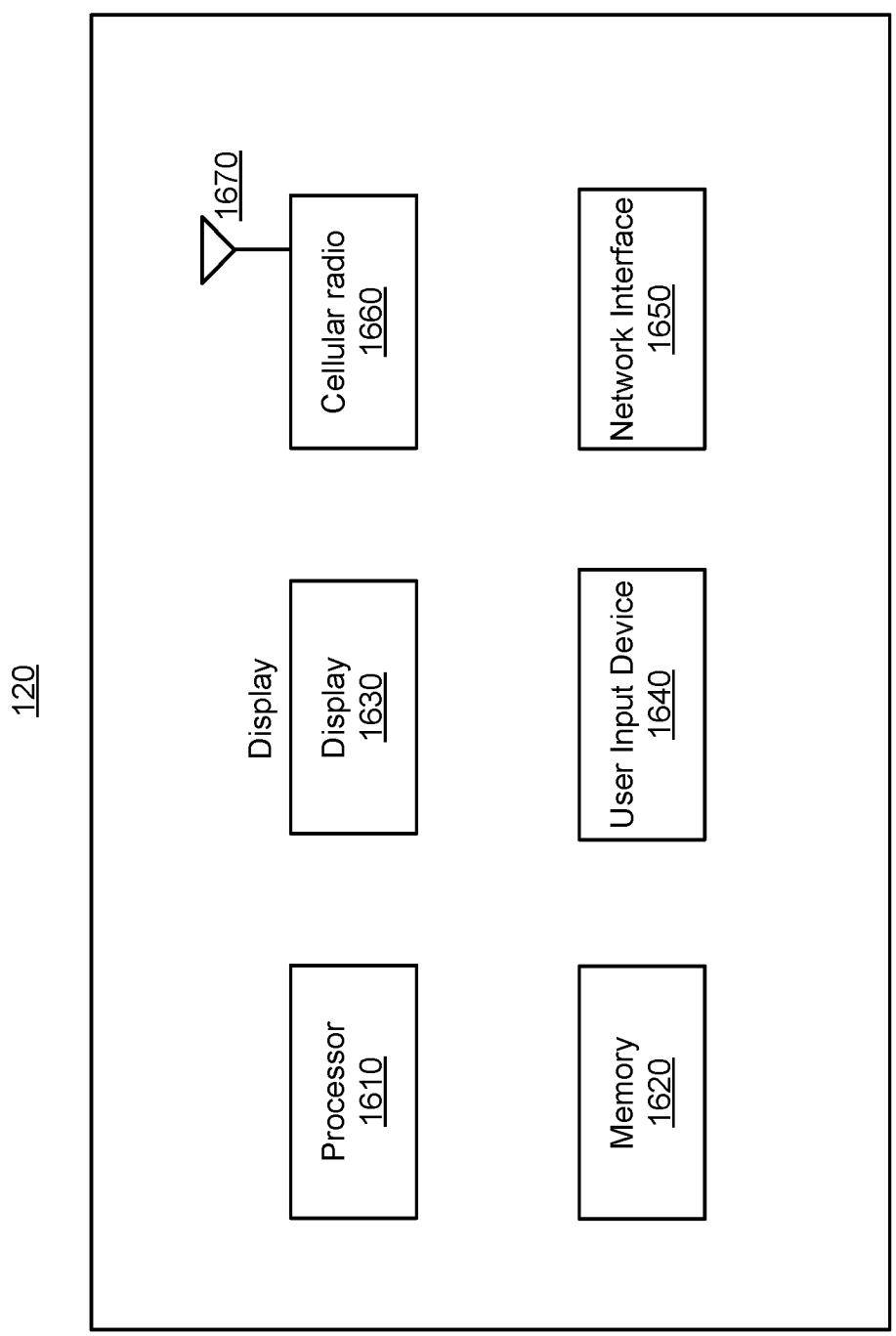
FIG. 16 depicts an apparatus, in accordance with some example embodiments.

FIG. 16 depicts a sports node apparatus, in accordance with some example embodiments. Sports node 120 (such as one or more of sports nodes 120A-D may include processor 1610, memory 1620, display 1630, user input device 1640, network interface 1650, cellular radio 1660, and/or antenna 1670.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor such as processor 1620, which can be special or general purpose, coupled to receive data and instructions from, and to transmit data and instructions to, a storage system, at least one input device, and at least one output device. The programmable system or computing system may include clients and servers. A client and server are generally remote from each other and may interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable medium" refers to any medium such as memory 1620 used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device such as display 1630 which may include for example a cathode ray tube (CRT) or a liquid crystal display (LCD) or a light emitting diode (LED) monitor for displaying information to the user. A user input device such as user input device 1640 may include a keyboard and/or a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

Sports node 120 may include network interface 1650. Wired interfaces may include a universal serial bus (USB) interface, Ethernet interface, or any other wired interface. Wireless interface may include WiFi (any of the IEEE 802.11 family of standards), WiMAX (any of the IEEE 802.16 family of standards), Bluetooth, or any other wireless interface.

Sports node 120 may include cellular radio 1660. Cellular radio 1660 may interoperate with any cellular telephone standard including, but not limited to 2G/3G/4G/5G/and/or Global System for Mobile Communications (GSM) interface.

In the descriptions above, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows described herein do not necessarily require the particular order shown, or sequential order, to achieve desirable results. The scope of the following claims may include other implementations or embodiments. Moreover, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims. Furthermore, the specific values provided in the foregoing are merely examples and may vary in some implementations.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method for playing and determining a winner of a fantasy sports game played on computer implemented application on a network comprising a plurality of nodes, the method comprising:

creating, by a processor, a first fantasy team associated with a first node of the network, the first fantasy team having a plurality of first players corresponding to one or more positions of a professional sports league, wherein the plurality of first players comprise players in the professional sports league;

creating, by the processor, a second fantasy team associated with a second node of the network, the second fantasy team having a plurality of second players corresponding to one or more positions of the professional sports league, wherein the plurality of second players comprise players in the professional sports league;

matching, by the processor over the network, the second fantasy team to the first fantasy team, the first fantasy team to play the second fantasy team in the fantasy sports game;

wherein creating the first fantasy team comprises:
receiving, by the processor and based on an electronic token, a first team selection decision at the first node, the first team selection decision selecting a first player from the players of the professional sports league, the electronic token indicating a node of the plurality of nodes that needs to make a decision;

wherein creating the second fantasy team comprises:
receiving, by the processor and based on the electronic token, an indication of a second team selection decision at the second node, the second team selection decision selecting a second player from the players of the professional sports league, wherein the network provides a threshold quality of service during the creating the first fantasy team and during the creating the second fantasy team;

generating, by the processor, statistical information associated with each player of the plurality of first players on the first fantasy team and statistical information associated with each player of the plurality of second players on the second fantasy team, wherein the generating comprises, for each player of the plurality of first players and each player of the plurality of second players:

selecting a random game, the random game comprising a historical game played by the player, the random game being different for each player;

retrieving, from a server, statistical information for the random game, the statistical information associated with the player; and calculating a total player score for the player based on the retrieved statistical information associated with the player and the random game;

calculating, by the processor and once all games for all players of the first fantasy team are completed, a first base fantasy team score by adding together the total player score for each player of the first fantasy team;

providing, by the processor, the first base fantasy team score to a display of a user interface;

randomly selecting, by the processor and after calculating the first base fantasy team score, a first additional player to add to the plurality of first players of the first fantasy team; and calculating, by the processor, a first final fantasy team score by adding a first bonus score to the first fantasy team score, the first bonus score based on a random historical game associated with the first additional player;

providing, by the processor, the first final fantasy team score to the display;

comparing, by the processor, the first final fantasy team score to a second final fantasy team score, the second final fantasy team score comprising a sum of a second base fantasy team score and a second bonus score, the second base fantasy team score calculated by adding together the total player score for each player of the second fantasy team, the second bonus score based on a random historical game associated with a second additional player, the second additional player added to the plurality of second players of the second fantasy team;

determining, by the processor and based on the comparing, a winner of the fantasy sports game; and providing, by the processor and responsive to the determining, the winner to the display.

2. The method of claim 1, wherein creating the first fantasy team comprises receiving a selection of one or more first players from a list of the players in the professional sports league.

3. The method of claim 2, wherein receiving the selection comprises receiving the selection over the network via a user interface.

4. The method of claim 2, wherein the list of the first players in the professional sports league is based on at least one of a number of games played, a number of all-star selections, or a hall of fame status.

5. The method of claim 1, wherein creating the first fantasy team comprises randomly selecting one or more first players from a list of the players in the professional sports league.

6. The method of claim 1, wherein the randomly selecting is based on at least one of a number of games played, a number of all-star selections, or a hall of fame status of the additional player, wherein creating the first fantasy team comprises receiving, by the processor, a selection of a player lineup for the first fantasy team, the player lineup including a subset of the plurality of first players, the first final fantasy team score based on the player lineup.

7. The method of claim 1, wherein the professional sports league comprises the National Football League (NFL), wherein the first additional player corresponds to a kicker position.

8. The method of claim 1, further comprising receiving, by the processor, an indication from a node of the plurality of nodes, the indication initiating the fantasy sports game.

9. The method of claim 1, wherein providing the first base fantasy team score to a display comprises displaying the statistical information for each player over a period of time corresponding to the real games played.

10. The method of claim 1, wherein retrieving the statistical information comprises retrieving the statistical information from a database on a sports service node of the network.

11. A fantasy sports game system, the system comprising:
a plurality of nodes configured to act as a client on a network;
a server configured to communicate with the plurality of nodes over the network, the server comprising:
at least one programmable processor; and
a machine-readable medium storing instructions that, when executed by the at least one programmable processor, cause the at least one programmable processor to perform operations comprising:
creating a first fantasy team associated with a first node of the network, the first fantasy team having a plurality of first players corresponding to one or more positions of a professional sports league, wherein the plurality of first players comprise players in the professional sports league;
creating a second fantasy team associated with a second node of the network, the second fantasy team having a plurality of second players corresponding to one or more positions of the professional sports league, wherein the plurality of second players comprise players in the professional sports league;
matching, by the server over the network, the second fantasy team to the first fantasy team, the first fantasy team to play the second fantasy team in the fantasy sports game;
wherein creating the first fantasy team comprises:
receiving, by the processor and based on an electronic token, a first team selection decision at the first node, the first team selection decision selecting a first player from the players of the professional sports league, the electronic token indicating a node of the plurality of nodes that needs to make a decision;
wherein creating the second fantasy team comprises:
receiving, by the processor and based on the electronic token, an indication of a second team selection decision at the second node, the second team selection decision selecting a second player from the players of the professional sports league, wherein the network provides a threshold quality of service during the creating the first fantasy team and during the creating the second fantasy team;
generating statistical information associated with each player of the plurality of first players on the first fantasy team and statistical information associated with each player of the plurality of second players on the second fantasy team, wherein the generating comprises, for each player of the plurality of first players and each player of the plurality of second players:
selecting a random game, the random game comprising a historical game played by the player, the random game being different for each player;
retrieving statistical information for the random game, the statistical information associated with the player; and
calculating a total player score for the player based on the retrieved statistical information associated with the player; and
calculating, once all games for all players of the first fantasy team are completed, a first base fantasy team score by adding together the total player score for each player of the first fantasy team;
providing the first base fantasy team score to a display of a user interface;
randomly selecting, after calculating the first base fantasy team score, a first additional player to add to the plurality of first players of the first fantasy team; and
calculating a first final fantasy team score by adding a first bonus score to the first base fantasy team score, the first bonus score based on a random historical game associated with the first additional player; and
providing the first final fantasy team score to the display;
comparing the first final fantasy team score to a second final fantasy team score, the second final fantasy team score comprising a sum of a second base fantasy team score and a second bonus score, the second base fantasy team score calculated by adding together the total player score for each player of the second fantasy team, the second bonus score based on a random historical game associated with a second additional player, the second additional player added to the plurality of second players of the second fantasy team;
determining, based on the comparing, a winner of the fantasy sports game; and
providing, responsive to the determining, the winner to the display.

12. A system as in claim 11, wherein creating the first fantasy team comprises receiving a selection of one or more first players from a list of the players in the professional sports league.

13. A system as in claim 12, wherein receiving the selection comprises receiving the selection over the network via a user interface.

14. A system as in claim 12, wherein the list of the first players in the professional sports league is based on at least one of a number of games played, a number of all-star selections, or a hall of fame status.

15. A system as in claim 11, wherein creating the first fantasy team comprises randomly selecting one or more first players from a list of the players in the professional sports league.

16. A system as in claim 11, wherein the randomly selecting is based on at least one of a number of games played, a number of all-star selections, or a hall of fame status of the first additional player.

17. A computer program product comprising a non-transitory machine-readable medium storing instructions that, when executed by at least one programmable processor, cause the at least one programmable processor to perform operations comprising:
creating a first fantasy team associated with a first node of a network, the first fantasy team having a plurality of first players corresponding to one or more positions of a professional sports league, wherein the plurality of first players comprise players in the professional sports league;

creating a second fantasy team associated with a second node of the network, the second fantasy team having a plurality of second players corresponding to one or more positions of the professional sports league, wherein the plurality of second players comprise players in the professional sports league;

matching the second fantasy team to the first fantasy team, the first fantasy team to play the second fantasy team in the fantasy sports game;

wherein creating the first fantasy team comprises:
  receiving, by the processor and based on an electronic token, a first team selection decision at the first node, the first team selection decision selecting a first player from the players of the professional sports league, the electronic token indicating a node of the plurality of nodes that needs to make a decision;

wherein creating the second fantasy team comprises:
receiving, by the processor and based on the electronic token, an indication of a second team selection decision at the second node, the second team selection decision selecting a second player from the players of the professional sports league, wherein the network provides a threshold quality of service during the creating the first fantasy team and during the creating the second fantasy team;

generating statistical information associated with each player of the plurality of first players on the first fantasy team and statistical information associated with each player of the plurality of second players on the second fantasy team, wherein the generating comprises, for each player of the plurality of first players and each player of the plurality of second players:
  selecting a random game, the random game comprising a historical game played by the player, the random game being different for each player;
  retrieving statistical information for the random game, the statistical information associated with the player; and
  calculating a total player score for the player based on the retrieved statistical information associated with the player; and calculating, once all games for all players of the first fantasy team are completed, a first base fantasy team score by adding together the total player score for each player of the first fantasy team;

providing the first base fantasy team score to a display of a user interface;

randomly selecting, after calculating the first base fantasy team score, a first additional player to add to the plurality of first players of the first fantasy team;

calculating a first final fantasy team score by adding a first bonus score to the first base fantasy team score, the first bonus score based on a random historical game associated with the first additional player; and providing the first final fantasy team score to the display;

comparing, by the processor, the first final fantasy team score to a second final fantasy team score, the second final fantasy team score comprising a sum of a second base fantasy team score and a second bonus score, the second base fantasy team score calculated by adding together the total player score for each player of the second fantasy team, the second bonus score based on a random historical game associated with a second additional player, the second additional player added to the plurality of second players of the second fantasy team;

determining, based on the comparing, a winner of the fantasy sports game; and providing, responsive to the determining, the winner to the display.

18. A computer program product as in claim 17, wherein creating the first fantasy team comprises receiving a selection, over the network via a user interface, of one or more players from a list of the players in the professional sports league.

19. A computer program product as in claim 17, wherein creating the first fantasy team comprises randomly selecting one or more first players from a list of the players in the professional sports league, wherein the list of the players in the professional sports league is based on at least one of a number of games played, a number of all-star selections, or a hall of fame status.

20. A computer program product as in claim 17, wherein the randomly selecting is based on at least one of a number of games played, a number of all-star selections, or a hall of fame status of the first additional player.

* * * * *